(12) United States Patent
Friebel et al.

(10) Patent No.: US 8,490,089 B2
(45) Date of Patent: Jul. 16, 2013

(54) GUEST TIMER FACILITY TO IMPROVE MANAGEMENT IN A VIRTUALIZED PROCESSING SYSTEM

(75) Inventors: Thomas Friebel, Dresden (DE); Uwe Dannowski, Moritzburg (DE); Sebastian Biemueller, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 148 days.

(21) Appl. No.: 12/940,391

(22) Filed: Nov. 5, 2010

(65) Prior Publication Data

US 2012/0117564 A1    May 10, 2012

(51) Int. Cl.
  *G06F 9/455*  (2006.01)
  *G06F 1/12*  (2006.01)
  *G06F 13/42*  (2006.01)

(52) U.S. Cl.
  USPC .............................................. 718/1; 713/400

(58) Field of Classification Search
  None
  See application file for complete search history.

(56) References Cited

U.S. PATENT DOCUMENTS

| | | | | |
|---|---|---|---|---|
| 7,475,002 | B1 * | 1/2009 | Mann | 703/23 |
| 2004/0049706 | A1 * | 3/2004 | Strong | 713/400 |
| 2006/0130059 | A1 * | 6/2006 | Bennett et al. | 718/1 |
| 2007/0033589 | A1 * | 2/2007 | Nicholas et al. | 718/1 |
| 2009/0132846 | A1 * | 5/2009 | Song | 713/502 |
| 2010/0250230 | A1 * | 9/2010 | Ganguly et al. | 703/26 |
| 2010/0251235 | A1 * | 9/2010 | Ganguly et al. | 718/1 |

OTHER PUBLICATIONS

COMPAQ/INTEL/MICROSOFT/PHOENIX/TOSHIBA "ACPI Hardware Specifications," Revision 2.0, Jul. 27, 2000, 5 pages.
VMware, "Timekeeping in VMware Virtual Machines," VMware® ESX 3.5/ESXi 3.5, VMware Workstation 6.5, Information Guide, 2008, pp. 1-26.
Wikipedia, "Hyper-V", URL:.wikipedia.org/wiki/Hyper-V>, downloaded Jun. 24, 2010, pp. 1-10.
Wikipedia, "Time Stamp Counter," URL.wikipedia.org/wiki/Time_Stamp_Counter>, downloaded Jun. 24, 2010, pp. 1-4.
McDowell, Steve and Strongin, Geoffrey, "Pacifica—Next Generation Architecture for Efficient Virtual Machines," Microsoft WinHEC 2005, Microsoft Windows Hardware & Driver Central, 2005, 29 pages.

* cited by examiner

*Primary Examiner* — Meng An
*Assistant Examiner* — Bradley Teets
(74) *Attorney, Agent, or Firm* — Abel Law Group, LLP

(57) ABSTRACT

A method includes, in a virtualized processing system, generating a local value of a first counter. The local value is accessible while executing in a first mode of the virtualized processing system. The local value is generated based on a value of a second counter and a ratio of a rate of the first counter to a rate of the second counter. The first counter is inaccessible while executing in the first mode of the virtualized processing system and accessible while executing in a second mode of the virtualized processing system. The first mode may be a guest mode and the second mode may be a host mode. The first counter may be an ACPI Power Management Timer. The second counter may be a Time Stamp Counter.

22 Claims, 4 Drawing Sheets

GUEST TIMER FACILITY TO IMPROVE MANAGEMENT IN A VIRTUALIZED PROCESSING SYSTEM

BACKGROUND

1. Field of the Invention

The invention is related to computing systems and more particularly to timekeeping in computer systems.

2. Description of the Related Art

In a typical processing system, software (e.g., operating system, run-time system, application, or other software) monitors the absolute time and/or the passage of time. For example, run-time systems calculate and verify timeouts and time-stamp system events. In performing those actions, the software reads a time value from a high-resolution time source. Depending upon the workload, software accesses to the time source can be relatively frequent (e.g., tens of thousands per second). A high-resolution time source available to the software is an Advanced Configuration and Power Interface (ACPI) Power Management (PM) Timer. The ACPI is a standard for device configuration and power management that defines platform-independent interfaces for hardware discovery, configuration, power management and monitoring. The standard defines a PM Timer Register having a length (in bytes) PM_TMR_LEN, which is accessed by software using an address specified in the register block (PM_TMR_BLK). Software access of the PM Timer Register returns a running value of the PM timer. Although the PM Timer is directly accessible to some software of a virtualized processing system (e.g., a virtual machine monitor or hypervisor executing in a host mode of the virtualized processing system), the PM Timer is only indirectly accessible to other software of the virtualized processing system (e.g., a guest executing on a virtual machine under control of a virtual machine monitor).

SUMMARY

In at least one embodiment of the invention, a method includes, in a virtualized processing system, generating a local value of a first counter. The local value is accessible while executing in a first mode of the virtualized processing system. The local value is generated based on a value of a second counter and a ratio of a rate of the first counter to a rate of the second counter. The first counter is inaccessible while executing in the first mode of the virtualized processing system and accessible while executing in a second mode of the virtualized processing system. In at least one embodiment of the method, the first mode is a guest mode and the second mode is a host mode. In at least one embodiment of the method, the first counter is an ACPI Power Management Timer. In at least one embodiment of the method, the second counter is a Time Stamp Counter.

In at least one embodiment of the invention, an apparatus includes a first counter accessible in a first mode of a virtualized processing system and at least one processor operable to execute a virtual machine monitor in the first mode of the virtualized processing system and operable to execute at least one guest in a second mode of the virtualized processing system. The at least one processor includes a second counter accessible in the second mode of the virtualized processing system. The at least one processor is operable to generate a local value of the first counter, the local value being accessible while executing in the second mode of the virtualized processing system. The local value is updated in response to an access by the at least one guest to the first counter and based on a value of the second counter and a ratio of a rate of the first counter to a rate of the second counter.

In at least one embodiment of the invention, a computer program product encoded in at least one computer-readable storage medium includes one or more functional sequences executable as a virtual machine monitor in a first mode of operation of a virtualized processing system and executable to generate an interrupt in response to a switch from a guest executing in a second mode of operation of the virtualized processing system and further in response to an indication of a change in a most-significant bit of a first counter accessible in the first mode of operation. The indication is received based on a local value of the first counter. In at least one embodiment of the computer program product, the first counter is an ACPI Power Management Timer and the second counter is a Time Stamp Counter.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
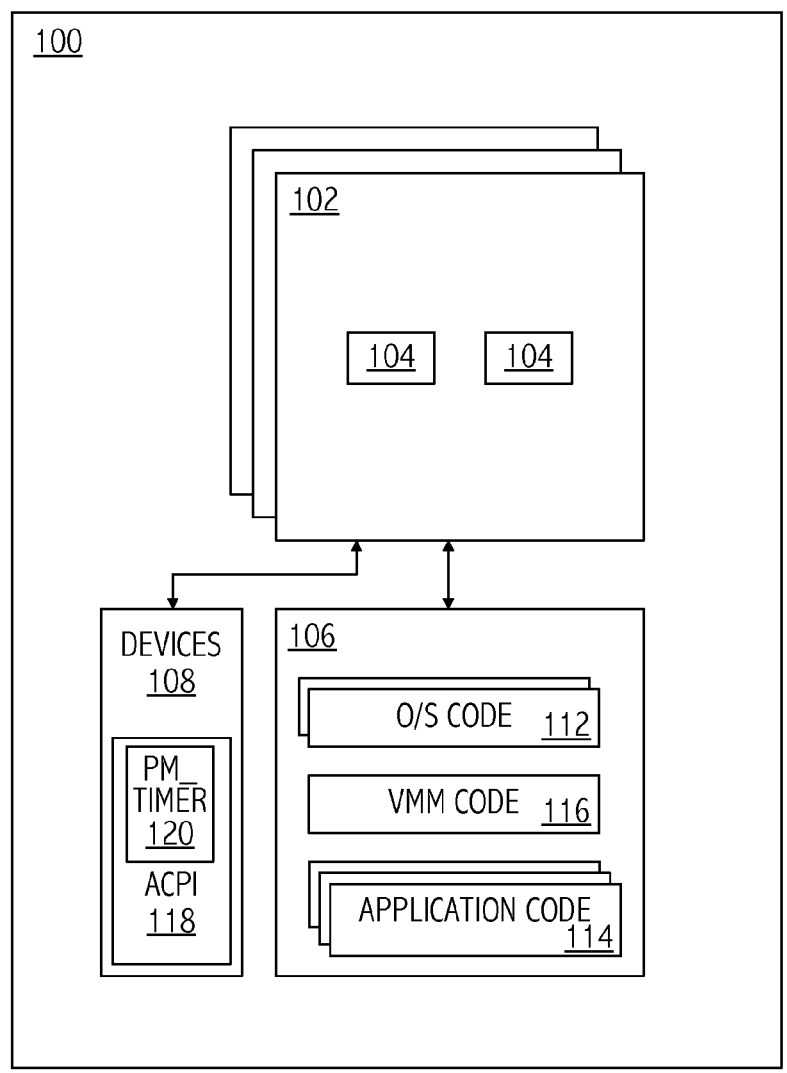
FIG. 1 illustrates a block diagram of an exemplary processing system consistent with at least one embodiment of the invention.

Referring to FIG. 1, an exemplary processing system (e.g., processing system 100) includes multiple processors (i.e., central processing unit, digital signal processor, graphics processor, e.g., processors 102), each of which includes one or more processor cores (i.e., cores, e.g., processor cores 104). Processors 102 are coupled to other processors 102, memory 106, devices 108, and storage 110 by one or more hub integrated circuits (e.g., memory controller hub and I/O controller hub), bus (e.g., PCI bus, ISA bus, and SMBus), other suitable communication interfaces, or combinations thereof. An operating system (e.g., Microsoft Windows, Linux, and UNIX) provides an interface between the hardware and a user (i.e., computing applications, e.g., applications 114). Execution of an operating system (e.g., operating system 112) may be distributed across a plurality of processors 102 and/or cores 104. The Advanced Configuration and Power Interface (ACPI) block and Power Management (PM) timer (e.g., PM Timer 120 of ACPI block 118) are accessible as a peripheral device. In at least one embodiment of processing system 100, the PM Timer is a memory-mapped I/O device. In at least one embodiment of processing system 100, the PM Timer is a port-mapped I/O device. In general, a port-mapped I/O uses a set of processor instructions dedicated to performing I/O operations (e.g., IN and OUT instructions, which can read and write one to four bytes (outb, outw, outl) to an I/O device).

Figure 2:
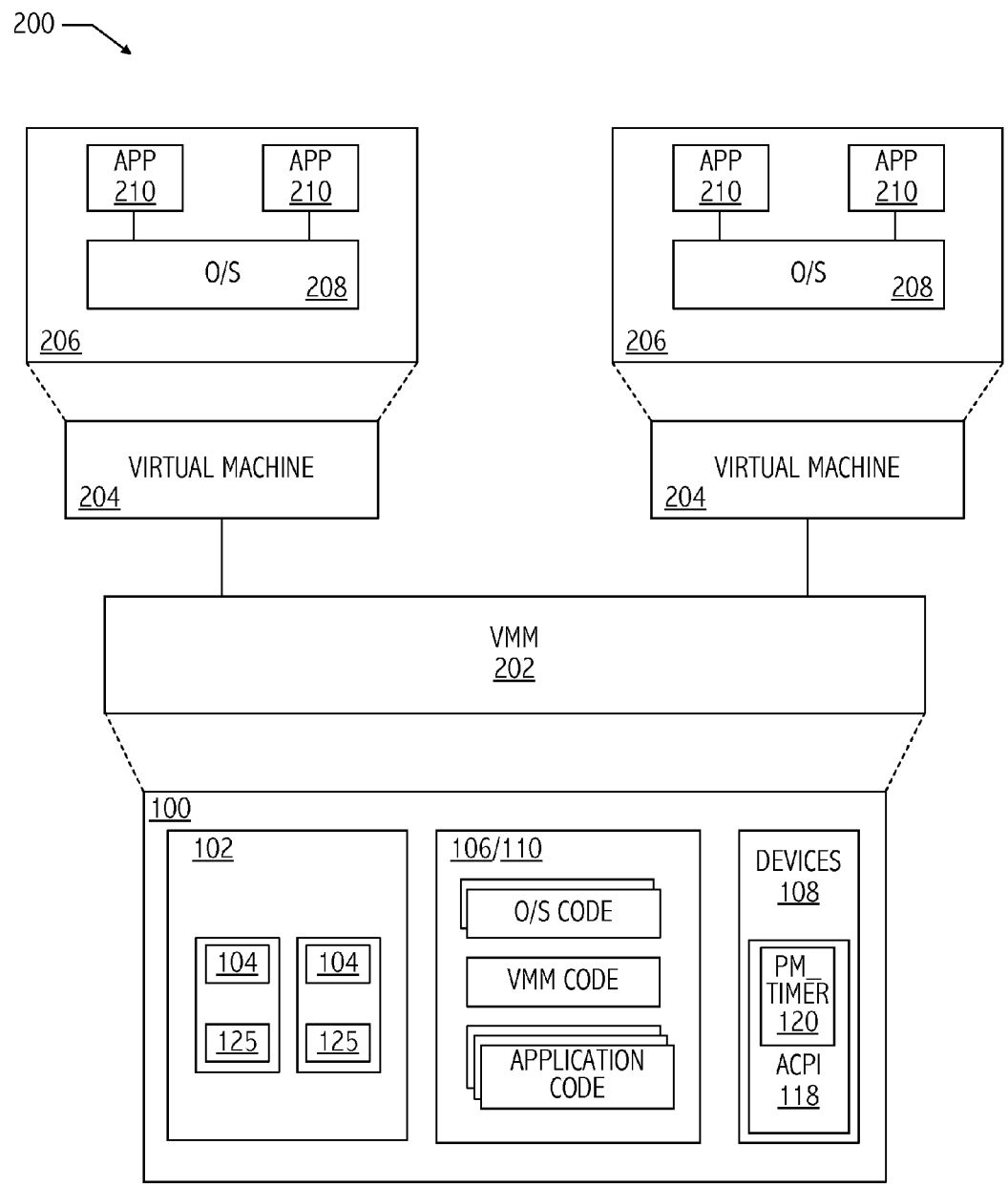
FIG. 2 illustrates a block diagram of an exemplary virtualized processing system consistent with at least one embodiment of the invention.

Referring to FIG. 2, virtualization of a computing system hides physical characteristics of the computing system from a user or guest (i.e., software executing on the computing system) and instead, presents an abstract emulated computing system (i.e., a virtual machine (VM)) to the user or guest. Physical hardware resources of processing system 100 are exposed to one or more users or guests (e.g., guests 206) as one or more corresponding isolated, apparently independent, virtual machines (e.g., VM 204). For example, a virtual machine may include one or more virtual resources (e.g., VCPU, VMEMORY, and VDEVICES) that are implemented by physical resources of processing system 100 that a virtual machine monitor (VMM) (i.e., hypervisor, e.g., VMM 202) allocates to the virtual machine.

As referred to herein, a "virtual machine monitor" (VMM, e.g., VMM 202) or "hypervisor" is software that provides the virtualization capability. The VMM provides an interface between the user or guest and the physical resources. Typically, the VMM provides each guest the appearance of full control over a complete computer system (i.e., memory, central processing unit (CPU) and all peripheral devices). A Type 1 (i.e., native) VMM is a standalone software program that executes on physical resources and provides the virtualization for one or more guests. A guest operating system executes on a level above the VMM. A Type 2 (i.e., hosted) VMM is integrated into or executes on an operating system, the operating system components execute directly on physical resources and are not virtualized by the VMM. The VMM is considered a distinct software layer and a guest operating system may execute on a third software level above the hardware. Although the description that follows refers to an exemplary Type 1 VMM, techniques described herein may be implemented in a Type 2 VMM.

Still referring to FIG. 2, while guest 206 has full control over the virtual resources of virtual machine 204, VMM 202 retains control over the physical resources. A guest system, e.g., an instance of an operating system (e.g., Windows, Linux, and UNIX) executes on a corresponding virtual machine and shares physical resources with other guest systems executing on other virtual machines. Thus, multiple operating systems (e.g., multiple instances of the same operating system or instances of different operating systems) can co-exist on the same computing system, but in isolation from each other.

VMM 202 is executed by some or all processor cores in the physical resources of processing system 200. An individual guest 206 is executed by one or more of processor cores included in the physical resources. The processors switch between execution of VMM 202 and execution of one or more guests 206. As referred to herein, a "world switch" is a switch between execution of a guest (i.e., software executing in a guest mode of processing system 200) and execution of a host (i.e., software executing in a host mode of processing system 200, e.g., executing VMM 202) or vice versa. In general, a world switch may be initiated by a VMRUN instruction of an AMD Secure Virtual Machine, a VMLAUNCH or VMRESUME virtual machine extension instruction of an Intel virtual machine, interrupt mechanisms, exception mechanisms, predetermined instructions defined by a control block (e.g., VMMCALL), or by other suitable technique. Although a particular world switch may be described herein as being initiated using a particular technique, other suitable techniques may be used. During a world switch, a current processor environment (e.g., processor core(s) executing guest 206 in guest mode or executing VMM 202 in host mode) saves its state information and restores state information for a target processor environment (e.g., processor core(s) executing VMM 202 in host mode or executing guest 206 in guest mode) to which the processor execution is switched. For example, VMM 202 initiates a world switch when VMM 202 executes a guest 206 that was scheduled for execution. Similarly, a world switch from executing guest 206 to executing VMM 202 is made when VMM 202 exercises control over physical resources, e.g., when guest 206 attempts to access a peripheral device, when a new page of memory is to be allocated to guest 206, or when it is time for VMM 202 to schedule another guest 206, etc. A typical world switch can take thousands of cycles.

Virtualization techniques may be implemented using only software (which includes firmware) or by a combination of software and hardware (which includes microcode). For example, some processors include virtualization hardware, which allows simplification of VMM code and improves system performance for full virtualization (e.g., hardware extensions for virtualization provided by AMD-V and Intel VT-x). Software, as described herein, may be encoded in at least one computer-readable storage medium selected from the set of a disk, tape, or other magnetic, optical, or electronic storage medium.

A guest executing on virtualized processing system 200 may rely on the Advanced Configuration and Power Interface (ACPI) Power Management (PM) Timer (hereinafter, "PM Timer," e.g., PM Timer 120 of ACPI 118) to provide a stable counter. However, in virtualized processing system 200, guest access to PM Timer 120 is disabled to prevent guest 206 from receiving time information inconsistent with a virtualized time environment maintained by VMM 202 for guest 206. In virtualized processing system 200, PM Timer 120 is accessible only to VMM 202. In response to an access of guest 206 to a virtual PM Timer, virtual processing system 200 must exit virtual machine 204 to VMM 202, which emulates the PM Timer with a virtual PM Timer. Each time guest 206 accesses the virtual PM timer, two world switches occur, i.e., one to exit guest 206 to virtual machine monitor 202 and one to return to guest 206. Typical virtualized workloads make a substantial number of accesses to the virtual PM Timer (e.g., thousands of virtual PM Timer accesses per second). A substantial number of cycles may be saved and performance of virtualized processing system 200 improved by reducing the number of world switches for virtual PM Timer accesses.

Figure 3:
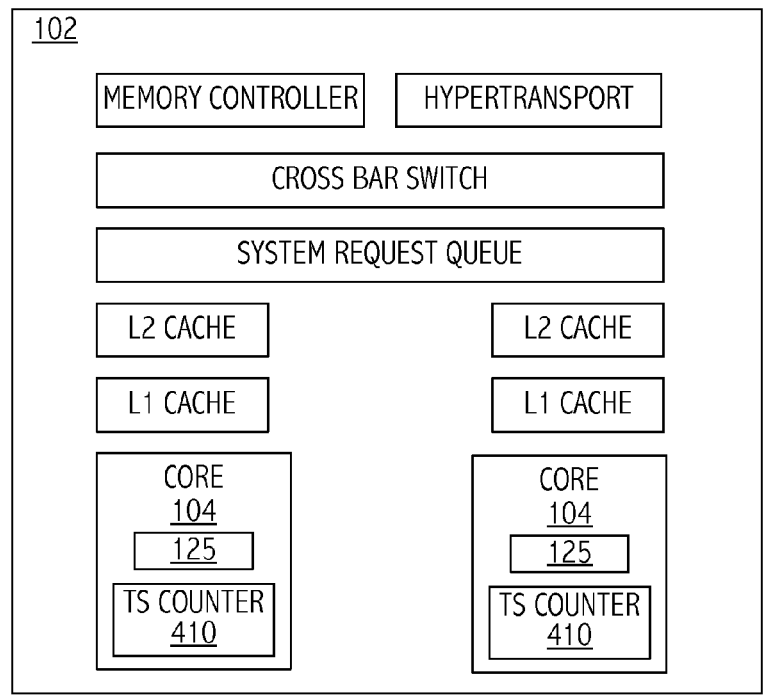
FIG. 3 illustrates a block diagram of an exemplary processor consistent with at least one embodiment of the invention.

Referring to FIGS. 2 and 3, in at least one embodiment of virtualized processing system 200, one or more processors 102 include PM Timer facility 125 that reduces the number of world switches for virtual PM Timer accesses, thereby reducing the number of world switches and improving performance, as compared to conventional processors without PM Timer facility 125. PM Timer facility 125 generates at least one local version of the PM Timer. In at least one embodiment of virtualized processing system 200, processor 102 includes a PM Timer facility 125 that locally calculates the return value of an I/O read to the virtual PM Timer counter I/O port. In at least one embodiment of virtualized processing system 200, processor 102 is a multi-core processor and each core includes a corresponding PM Timer facility 125. In at least one embodiment, PM Timer facility 125 calculates the return value based on a guest Time Stamp Counter (TSC) 410, without causing a world switch to the virtual machine monitor. In general, the Time Stamp Counter is a register (e.g., 64-bit) present on a processor that counts the number of ticks of a system clock since reset.

In at least one embodiment of virtualized processing system 200, PM Timer facility 125 calculates a value of the PM Timer based on the guest Time Stamp Counter (TSC) and the current guest Time Stamp Counter rate as follows:

$$PM\_TMR = (\text{current\_guest\_TSC}/\text{current\_guest\_TSC\_rate}/PM\_TMR\_\text{freq}) + \text{offset},$$

where current_guest_TSC is a current value of the guest TSC, current_guest_TSC_rate is the rate of the TSC, and PM_TMR_freq is the rate of the PM Timer. In at least one embodiment of PM Timer facility 125, the current_guest_TSC_rate is determined according to host_TSC_rate×guest TSC_ratio. Note that in at least one embodiment of PM Timer facility, the offset is zero and not included.

Figure 4:
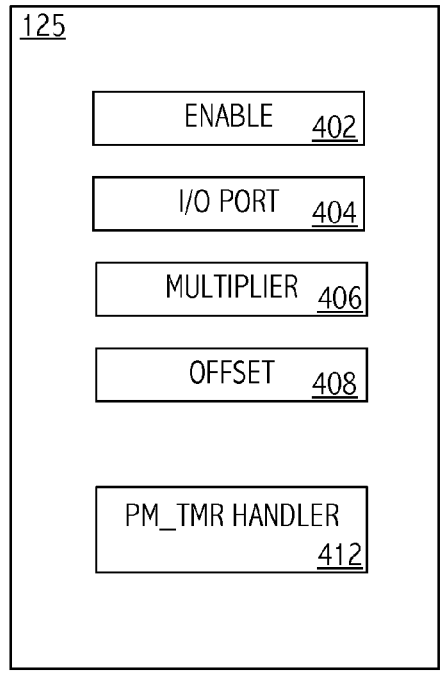
FIG. 4 illustrates a block diagram of an exemplary PM Timer facility of FIG. 3 consistent with at least one embodiment of the invention.

Referring to FIG. 4, in at least one embodiment, PM Timer facility 125 includes PM_TMR handler 412, and a plurality of storage elements, e.g., enable register 402, I/O port register 404, multiplier 406 (which is based on current_guest_TSC_rate and PM_TMR_freq), and offset 408 that contain information used by PM_TMR handler 412. Note that other embodiments of PM_TMR facility 125 include fewer storage elements or other storage elements that store other information used by PM_TMR microcode handler 412. In at least one embodiment, PM_TMR handler 412 includes a microcode routine. In at least one embodiment, PM_TMR handler 412 includes fixed function hardware.

In at least one embodiment of virtualized processing system 200, the port address of the virtual PM Timer is configurable to accommodate different virtual hardware configurations. For example, the port address is written to a virtual memory control block (VMCB) or a machine state register (i.e., model specific register, MSR). In at least one embodiment of virtualized processing system 200, the current guest Time Stamp Counter rate or a corresponding divisor is provided by the virtual machine monitor in the VMCB or an MSR. In at least one embodiment of virtualized processing system 200, the current guest TSC rate or the corresponding divisor is determined internally. In at least one embodiment, an offset is configured by the virtual machine monitor in the VMCB or an MSR. In at least one embodiment, the offset value, the TSC rate, and/or ratio or divisor are determined dynamically by VMM 202 based on power management information.

In at least one embodiment of virtualized processing system 200, availability of a PM Timer facility is indicated by a control bit. For example, a CPU identification (CPUID) feature bit of an x86 architecture indicates availability of the facility. In at least one embodiment of virtualized processing system 200, the PM Timer facility is selectively enabled by an enable bit. In at least one embodiment of virtualized processing system 200, VMM 202 sets the enable bit to enable PM Timer facility 125 to speed up PM_TMR virtualization. PM Timer facility 125 provides the local value of the PM Timer in substantially fewer cycles (e.g., an order of magnitude fewer cycles) than an I/O read to the virtual PM Timer when emulated by VMM 202. For example, PM Timer facility 125 provides the return value in approximately hundreds of cycles, as compared to approximately thousands of cycles for an access of the virtual PM Timer that exits to the virtual machine monitor.

In at least one embodiment of virtualized processing system 200, guest 206 has enabled a PM_TMR interrupt associated with the virtual PM Timer. PM Timer facility 125 causes a guest to exit to virtual machine monitor 202 on a first access of the virtual PM timer after a most-significant bit of the virtual PM Timer counter has changed state since the last/previous access of guest 206 to the virtual PM Timer. Virtual machine monitor 202 then generates an associated interrupt for guest 206 in virtual machine 204 to handle the change in the most-significant bit of the virtual PM Timer. In at least one embodiment, PM timer facility 125 is implemented using the registers described above (e.g., TS counter, offset) and a PM Timer handler (e.g., PM_TMR handler 412), which in at least one embodiment is a microcode routine. If PM Timer facility 125 is enabled, PM Timer facility 125 handles read accesses to the selected I/O port (e.g., 0x1f48) while virtualized processing system 200 executes in guest mode. PM Timer facility 125 returns the value of the virtual PM Timer calculated based on the current TSC, a multiplier, and an offset. In at least one embodiment of PM Timer facility 125, the offset is not needed and the corresponding register is not included in processor 104. In at least one embodiment, PM Timer facility 125 determines whether the most-significant timer bit has changed since the last read operation. If so, PM Timer facility 125 causes an exit to virtual machine monitor 202 and virtual machine monitor 202 triggers a PM_TMR interrupt in virtual machine 204.

Figure 5:
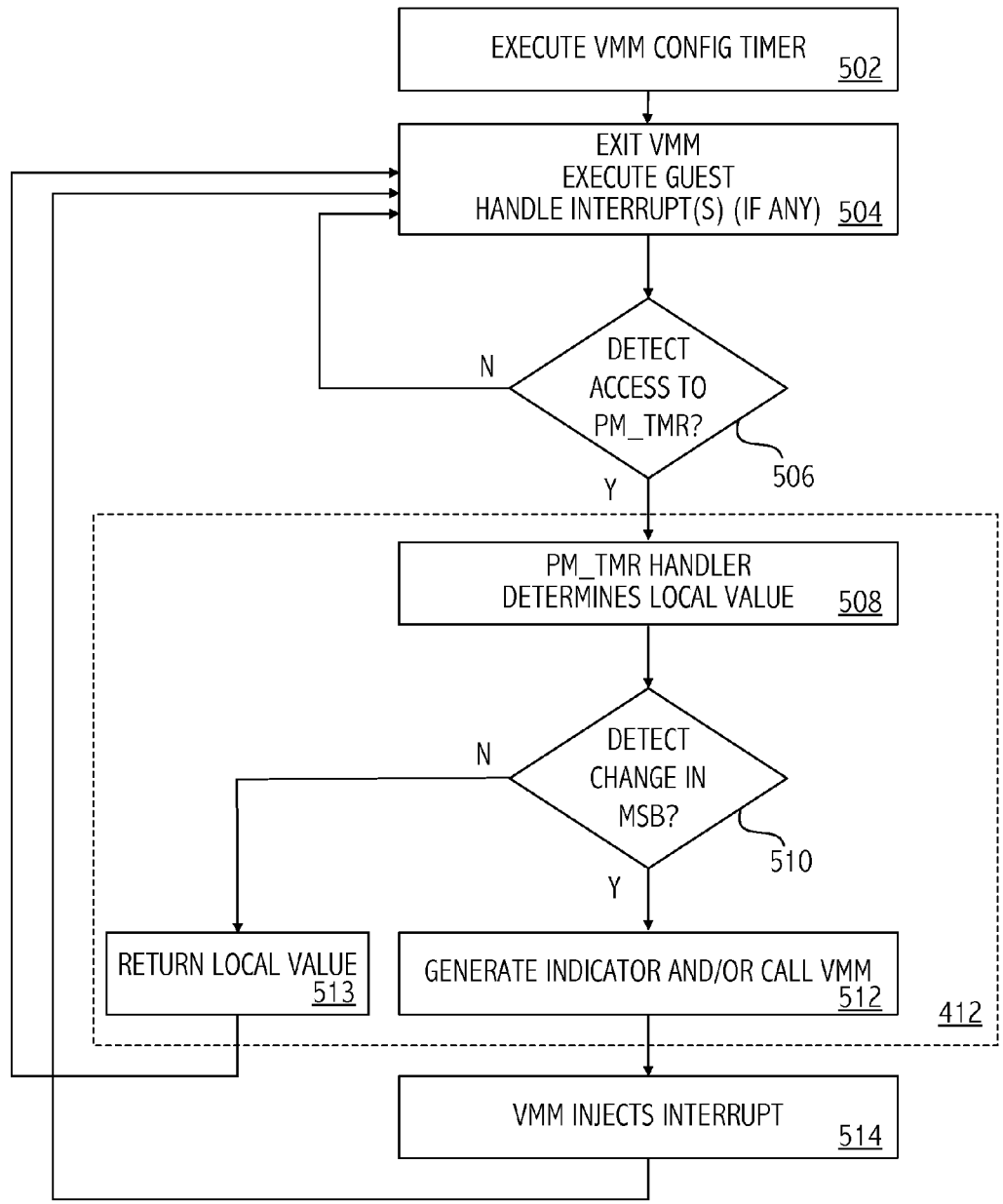
FIG. 5 illustrates information and control flows associated with an exemplary PM Timer handler of FIG. 3 consistent with at least one embodiment of the invention.

Referring to FIGS. 2, 4, and 5, an exemplary virtualized processing system 200 executes virtual machine monitor 202, which configures PM Timer facility 125 (502). In at least one embodiment, VMM 202 determines whether the PM Timer facility 125 is enabled based on configuration information received from memory, input/output devices, or other suitable technique. In at least one embodiment, VMM 202 loads a multiplier value (e.g., a ratio of a rate of the PM Timer to the rate of the TSC) into multiplier register 406. In at least one embodiment, VMM 202 loads an offset value into offset register 408. In at least one embodiment of virtualized processing system 200, the I/O port of the PM Timer, which is published in a Fixed ACPI Description Table (FADT), is loaded into I/O port register 404. In at least one embodiment of virtualized processing system 200, VMM 202 produces that table and loads the value into I/O port register 404.

Virtualized processing system 200 exits the virtual machine monitor 202 and executes one or more guests 206 on one or more corresponding virtual machines 204 (504). In at least one embodiment of virtualized processing system 200, a guest 206 boots and enables PM Timer interrupt. In at least one embodiment, the PM_TMR interrupt is selectively enabled based on configuration information received from memory, input/output devices, or other suitable technique. If virtual processing system 200 detects an access to the virtual PM Timer (506), e.g., by monitoring guest accesses to hardware I/O ports and comparing the port I/O address to an address in I/O port register 404, then virtualized processing system 200 accesses the PM_TMR handler 412, which in at least one embodiment includes a microcode routine. Otherwise, virtualized processing system 200 continues as if PM Timer facility 125 were not present (504).

In at least one embodiment, PM_TMR handler 412 determines the local value of the PM Timer, as described above (508). If PM_TMR handler 412 does not detect a change in most-significant bit condition of the PM Timer (510), then PM_TMR handler 412 returns the local value of the PM Timer to the guest (513) and guest execution continues (504). In general, when the PM Timer itself rolls over (i.e., returns to zero), it continues counting from zero. In at least one embodiment, PM_TMR handler 412 detects a change in a most-significant bit condition of the PM Timer by comparing a most-significant bit of the local value of the PM Timer to the most significant bit of the prior local value of the PM Timer (510). If they are different, then PM_TMR handler 412 sets an indicator accordingly. In at least one embodiment of virtual machine 200 a PM_TMR interrupt is enabled and PM_TMR handler 412 executes a call to virtual machine monitor 202 in response to the indication (512). In at least one embodiment, virtual machine monitor 202 injects a PM_TMR interrupt based on the change in the most-significant bit indicator (514). In at least one embodiment of virtual machine 200, an interrupt handler in the guest performs operations to maintain PM Timer counter bits beyond the width of the PM Timer counter register (e.g., 32 bits wide) to implement a wider counter (e.g., 64-bit timer value) and after returning from the interrupt, virtual processing system 200 returns to guest operation (504).

Structures described herein may be implemented using software (which includes firmware) executing on a processor or by a combination of software and hardware. While circuits and physical structures are generally presumed, it is well recognized that in modern semiconductor design and fabrication, physical structures and circuits may be embodied in tangible, computer-readable descriptive form suitable for use in subsequent design, test or fabrication stages. Structures and functionality presented as discrete components in the exemplary configurations may be implemented as a combined structure or component. Various embodiments of the invention are contemplated to include circuits, systems of circuits, related methods, and tangible computer-readable media having encodings thereon (e.g., HDL, Verilog, GDSII data) of such circuits, systems, and methods, all as described herein, and as defined in the appended claims.

The description of the invention set forth herein is illustrative, and is not intended to limit the scope of the invention as set forth in the following claims. For example, while the invention has been described in an embodiment in which an ACPI PM Timer and a guest Time Stamp Counter are used, one of skill in the art will appreciate that the teachings herein can be utilized for other time sources. Variations and modifications of the embodiments disclosed herein may be made based on the description set forth herein, without departing from the scope and spirit of the invention as set forth in the following claims.

What is claimed is:

1. A method comprising:
   executing a guest under control of a virtual machine monitor on at least one processor in a guest mode of a virtualized processing system; and
   generating a local value of a first counter by a facility, the local value being accessible while executing in the guest mode of the virtualized processing system, the local value being generated in response to an access by the at least one guest to a virtual version of the first counter, the local value being generated based on a value of a second counter and a ratio of a rate of the first counter to a rate of the second counter, wherein the first counter is inaccessible while executing in the guest mode of the virtualized processing system and accessible while executing in a second mode of the virtualized processing system, wherein the second counter is a counter that counts a number of ticks of a system clock since reset.

2. The method, as recited in claim 1, wherein the second mode is a host mode.

3. The method, as recited in claim 1, wherein the local value of the first counter is generated by at least one of hardware and microcode.

4. The method, as recited in claim 1, wherein the local value is generated further based on an offset value.

5. The method, as recited in claim 1, further comprising:
   executing the virtual machine monitor on the at least one processor in the second mode of the virtualized processing system.

6. The method, as recited in claim 1, wherein the first counter is an Advanced Configuration Power Interface (ACPI) Power Management (PM) Timer.

7. The method, as recited in claim 1, wherein the second counter is a Time Stamp Counter.

8. The method, as recited in claim 1, further comprising:
   detecting an attempted access to the first counter based on a predetermined I/O port address and an address associated with an I/O port access.

9. The method, as recited in claim 1, further comprising:
   detecting an attempted access to the first counter based on a predetermined I/O memory address and an address associated with a memory-mapped access.

10. The method, as recited in claim 1, further comprising:
    while executing in the second mode of the virtualized processing system, initializing the local value of the first counter and the ratio of rate of the first counter to the rate of the second counter.

11. The method, as recited in claim 1, further comprising:
    in response to the local value of the first counter having a most significant bit with a first value and a prior local value of the first counter having a most significant bit with a second value different from the first value, switching the virtualized processing system from executing in the guest mode to executing in the second mode.

12. The method, as recited in claim 11, further comprising:
    while executing in the second mode, injecting an interrupt to handle change in the most-significant bit.

13. An apparatus comprising:
    a first counter accessible in a first mode of a virtualized processing system;
    at least one processor operable to execute a virtual machine monitor in the first mode of the virtualized processing system and operable to execute at least one guest in a guest mode of the virtualized processing system, wherein the at least one processor comprises a second counter accessible in the guest mode of the virtualized processing system, the second counter being a counter that counts a number of ticks of a system clock since reset,
    wherein the at least one processor further comprises a facility operable to generate a local value of the first counter, the local value being accessible while executing in the guest mode, the local value being updated in response to an access by the at least one guest to the first counter and based on a value of the second counter and a ratio of the rate of the first counter to the rate of the second counter.

14. The apparatus, as recited in claim 13, wherein the first mode is a host mode and the first counter is inaccessible while executing in guest mode of the virtualized processing system.

15. The apparatus, as recited in claim 13, further comprising:
    an offset storage element, wherein the local value is updated further based on an offset value stored in the offset storage element.

16. The apparatus, as recited in claim 13, wherein the first counter is an Advanced Configuration Power Interface (ACPI) Power Management (PM) Timer.

17. The apparatus, as recited in claim 13, wherein the second counter is a Time Stamp Counter.

18. The apparatus, as recited in claim 13, wherein the at least one processor further comprises:
    at least one storage element operable to store an indicator of a ratio of a rate of the first counter to a rate of the second counter.

19. The apparatus, as recited in claim 13, wherein the at least one processor further comprises:
an I/O port storage element corresponding to the first counter.

20. A computer program product encoded in at least one non-transitory computer-readable storage medium, the computer program product comprising:
one or more functional sequences executable as a virtual machine monitor in a first mode of operation of a virtualized processing system and executable to generate an interrupt in response to a world switch from a guest executing in a guest mode of operation of the virtualized processing system and further in response to an indication of a change in a most-significant bit of a first counter accessible in the first mode of operation, the indication being based on a local value of the first counter available to the guest in the guest mode,
wherein the one or more functional sequences are further executable to initialize at least one of an offset value, a port value associated with the first counter, and a ratio of the first counter rate to a second counter rate used in the guest mode to determine the indication.

21. The computer program product, as recited in claim 20, wherein the first mode is a host mode.

22. The computer program product, as recited in claim 20, wherein the first counter is an Advanced Configuration Power Interface (ACPI) Power Management (PM) Timer and the second counter is a Time Stamp Counter.

* * * * *